Nov. 27, 1951  W. M. WOCHOS, JR., ET AL  2,576,377
PROTECTED RING GAUGE
Filed June 3, 1946
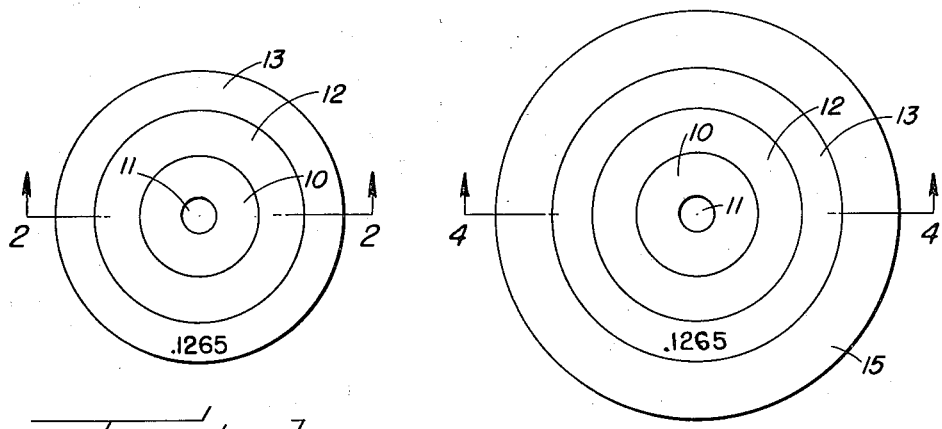
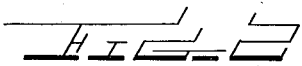
INVENTOR
Wenzel M. Wochos, Jr.
and
BY  Roger F. Waindle,
Mason, Porter, Diller + Stewart,
ATTORNEYS.

Patented Nov. 27, 1951

2,576,377

UNITED STATES PATENT OFFICE 2,576,377

PROTECTED RING GAUGE

Wenzel M. Wochos, Jr., Elgin, and Roger F. Waindle, Batavia, Ill., assignors to Elgin National Watch Company, Elgin, Ill., a corporation of Illinois Application June 3, 1946, Serial No. 673,998

1 Claim. (Cl. 33—178)

This invention relates to female gage devices, commonly known as ring gages; and is more particularly concerned with mounts for such gage members.

A feature of the invention is the provision of a ring gage mounting having a protective handling piece surrounding the gage member with resilient means for supporting the gage member in the piece.

Another feature is the provision of a secure unitary assembly having a stiff protective ring, a ring gage member in the ring, and a resilient cushion connecting and supporting the ring and member relative to one another.

A further feature is the provision of a ring gage mounting having a stiff protective ring, a ring gage member in the ring, a resilient cushion between the ring and member, and external cushion sleeve surrounding the ring.

With these and other features as objects in view, illustrative forms of practice are shown in the accompanying drawings, in which:

Fig. 1 is a face view of one form of construction.

Fig. 2 is a diametral sectional view substantially on line 2—2 of Fig. 1.

Fig. 3 is a face view of another form.

Fig. 4 is a diametral sectional view substantially on line 4—4 of Fig. 3.

Ring gages ordinarily are formed of a substantially uniform thickness, with a hole having the shape and size desired for the mechanical element to be inspected, subject to tolerance allowances: and are usually provided in pairs known as GO and NOGO gages. Thus, if a cylindrical mechanical element can be as large as 0.1265 inches in diameter but must not be smaller than 0.1260 inches, that is, the tolerance is five-ten thousandths of an inch, the GO ring has a hole of 0.1265 inches and the NOGO ring has a hole of 0.1260 inches. In use, the GO ring is applied to the element. If the element does not pass through, it is rejected as being too large; while if it passes, the NOGO ring is applied. If upon this second test, the NOGO ring slips onto the element, it is rejected as too small; while if the NOGO ring cannot pass onto the element, it is accepted as falling within the tolerance limits.

These gaging operations are largely performed by the hand of the inspector. Even with great skill and experience, the ring gage is seldom applied exactly in line with the element and moved in the direction of the element axis. Hence stresses abnormal to the theoretically correct use of the gage are produced upon the gage and upon the element. These stresses become proportionally larger as the element is smaller: and due to the great relative strength of the hand at the smaller sizes of, say, 4 to 10 thousandths of an inch for the diameter of the element and, say, 3 thirty-seconds of an inch for the outside diameter of the ring gage, deformation of the element or of the gage may occur.

Such small gages are often made of transparent sapphire or like hard material, so that the permissible number of gaging operations before a ring gage becomes worn beyond allowable gage tolerances is many times that of hardened steel gages, for example. Such gages are small; hard to handle accurately; and may be hard to locate if dropped into a tray of partly assembled parts to be gaged.

According to the present invention, mechanical protection against breakage of a brittle gage ring, when dropped, is afforded by employing a resilient cushion sleeve around the ring gage member, this sleeve being of a different color than the transparent sapphire, for example, and serving to give the gage greater size and clearly identifiable appearance: and also permitting the gage to rock or move in the inspector's fingers during the operations of applying or removing it from the element under inspection. In the preferred form, further protection is given by a stiff surrounding ring of metal or plastic which bears the identification of the size to be gaged and is grasped by the inspector during use.

In the form of Figs. 1 and 2, the clear transparent sapphire ring gage member 10 has the gaging hole 11 of cylindrical form, with the lips slightly beveled for easy application and entry of the element to be inspected. Surrounding the member 10 is an annular sleeve 12 of soft flexible rubber, preferably synthetic buna compound which is resistant to the oils which may be present on the element or on the inspector's fingers. A stiff ring 13 may have a knurled edge for easy grasping: it may be formed of brass, aluminum, stainless steel, polyvinyl or polyacrylate resin, etc., and may bear indicia designating the size of the gaging hole. The rubber cushion sleeve 12 is preferably cemented or otherwise fixedly joined to both the gage member 10 and the ring 13 to provide a unitary assembly which is inseparable during ordinary use.

In employment, as described above, the gage member may shift linearly in radial or axial directions, and also may rock about radial or axial axes, to accommodate the element and avoid having the stresses rise to such levels as to cause breakage of the ring member, bending of the element, or excessive wear upon either.

In the form shown in Figs. 3 and 4, the parts are as described for Figs. 1 and 2, and in addition an external tire or sleeve 15 of soft rubber is provided, to further reduce strains and shock during normal use and to receive the shock if the gage be dropped.

In each form, the relatively low heat conductivity of the rubber sleeves is of value in limiting the transmission of heat from the inspector's fingers to the gage member itself, with the accompanying change of gage dimensions due to thermal expansion at the heated part even when the gage member, cushion sleeve, and protective ring have the same axial dimension or thickness, so that the fingers must grasp the assembly close to the gaging hole itself.

It is obvious that the illustrative forms are not restrictive, and that the invention may be practiced in other ways within the scope of the appended claim.

What is claimed is:

A ring gage having a ring gage member composed of sapphire and being susceptible to damage upon shock if dropped and expansible upon heating, said member having a gaging hole of predetermined size and shape extending therethrough, a stiff protective metal ring surrounding and spaced from said gage member, and a cushioning sleeve between and connected to said member and body for forming an inseparable unit assembly therewith, said sleeve being composed of a resiliently elastic soft rubber of low heat conductivity; said unit assembly having essentially the same axial thickness throughout.

WENZEL M. WOCHOS, JR.
ROGER F. WAINDLE.

REFERENCES CITED

The following references are of record in the file of this patent:

UNITED STATES PATENTS

| Number | Name | Date |
|---|---|---|
| 740,943 | Summersby et al. | Oct. 6, 1903 |
| 923,643 | Gratz, Jr. | June 1, 1909 |
| 1,711,724 | Deming | May 7, 1929 |
| 1,874,517 | Hartness | Aug. 30, 1932 |
| 2,057,507 | Weidenbacker | Oct. 13, 1936 |
| 2,159,327 | Hendrick | May 23, 1939 |
| 2,493,233 | Dower | Jan. 3, 1950 |

FOREIGN PATENTS

| Number | Country | Date |
|---|---|---|
| 234,142 | Switzerland | Sept. 15, 1944 |
| 798,430 | France | Mar. 10, 1936 |

OTHER REFERENCES

American Machinist, May 9, 1946, page 274.